April 8, 1930.  W. L. REID ET AL  1,753,532
METHOD AND APPARATUS FOR TESTING RODS
Filed Sept. 20, 1921  2 Sheets-Sheet 1
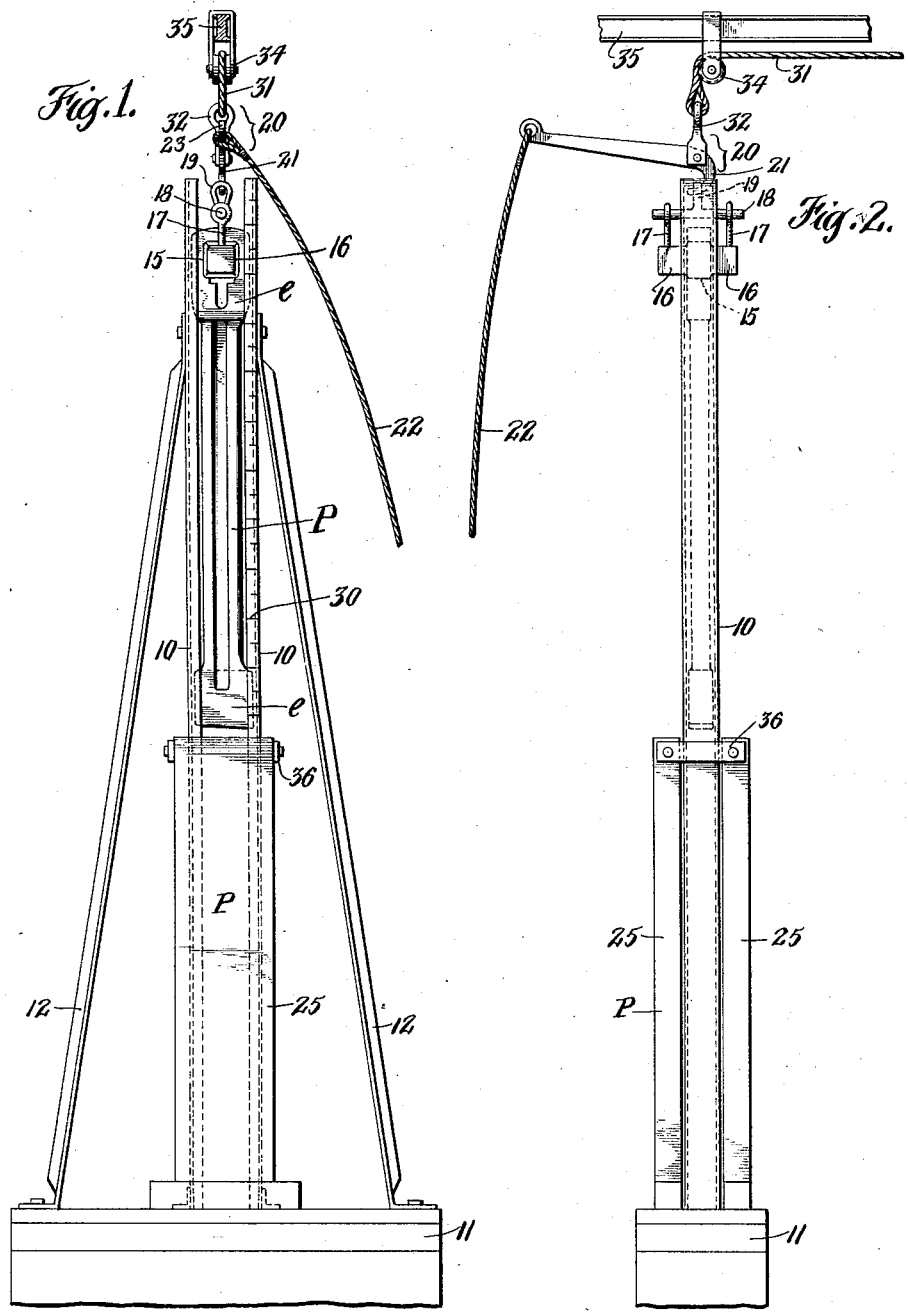
INVENTORS
William L. Reid and
Frank J. Bascombe
BY Hynnestvedt & Lechner
ATTORNEYS April 8, 1930.  W. L. REID ET AL  1,753,532
METHOD AND APPARATUS FOR TESTING RODS
Filed Sept. 20, 1921  2 Sheets-Sheet 2
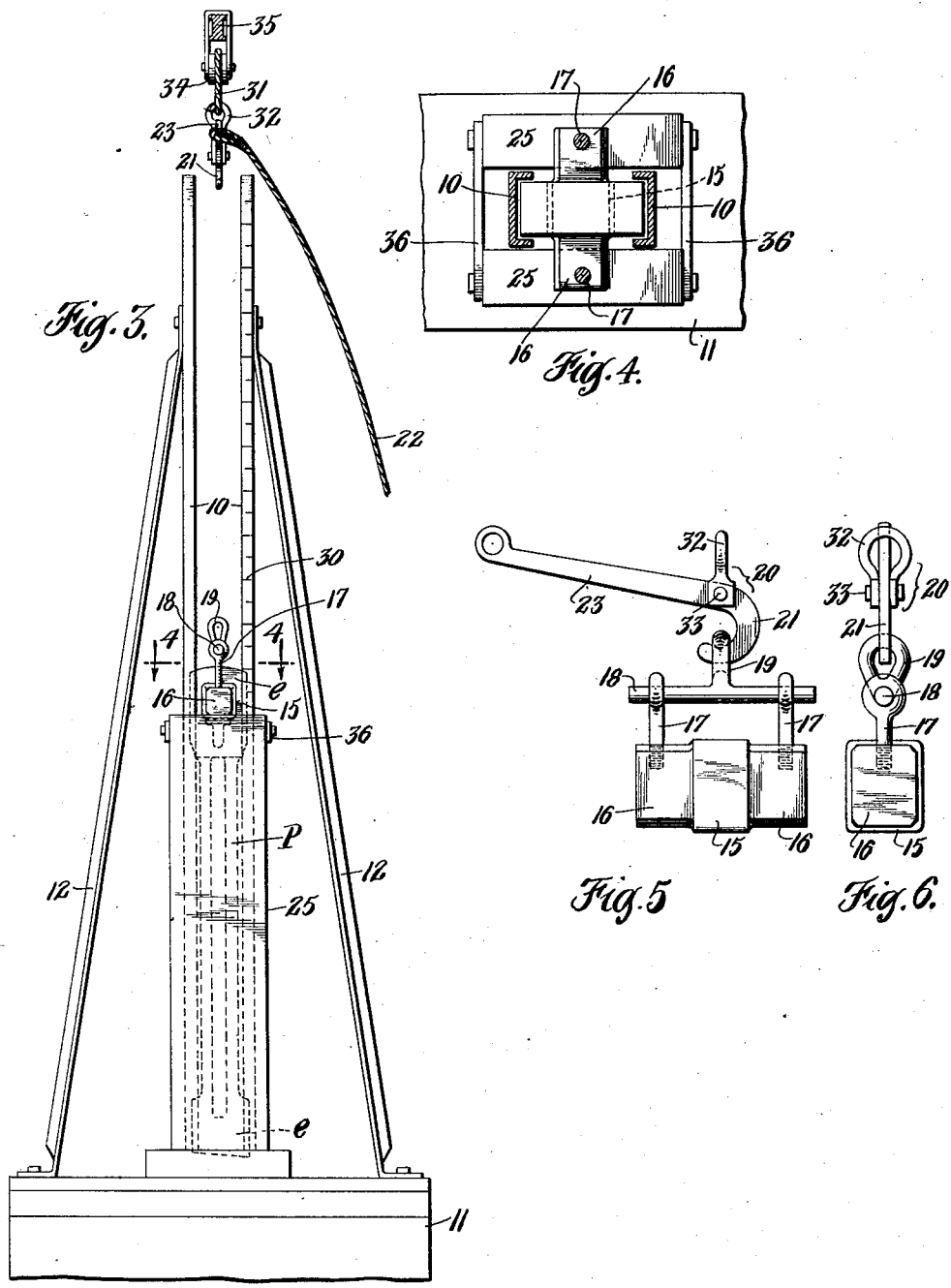

Patented Apr. 8, 1930

1,753,532

UNITED STATES PATENT OFFICE

WILLIAM L. REID AND FRANK J. BASCOMBE, OF LIMA, OHIO

METHOD AND APPARATUS FOR TESTING RODS

Application filed September 20, 1921. Serial No. 501,920.

Our invention relates to methods and apparatus for testing rods such as connecting rods, pitmen, drawbars and the like, and to the testing of locomotive main and side rods, and of other similar forgings. Our principal object is to afford a thoroughly reliable test of the soundness of rods and forgings,—a test which must assure discovery of interior defects such as often pass undetected by present modes of testing. Another advantage obtainable through our invention is uniformity and accuracy of results: both qualitatively, as to the freedom of pieces tested from blow holes, segregated impurities, or other latent defects,—and quantitatively, as to the effective strength of pieces in service. Other advantages include facility and expedition in the testing operation, and simplicity, convenience and durability of the testing apparatus.

How these and other advantages can be attained through our invention will appear from our description hereinafter of the best mode of carrying out the invention at present known to us. For the purpose of this disclosure we have illustrated and described the invention as applied to the testing of locomotive connecting rods, but it is to be clearly borne in mind that identically the same method can be applied to the testing of rods of other characters such as hereinbefore mentioned.

In the drawings, Fig. 1 is a side elevation of a testing machine or apparatus convenient for the purposes of our invention.

Fig. 2 is a similar view at right angles to Fig. 1, certain parts being omitted to avoid confusion.

Fig. 3 is a side elevation similar to Fig. 1 with certain parts in different positions.

Fig. 4 is a fragmentary plan view, on a larger scale, with certain parts in horizontal section as indicated by the line 4—4 in Fig. 3.

Fig. 5 is a detached view of certain parts similar to that afforded by Fig. 2, but on a larger scale.

Fig. 6 is a similar view corresponding to Fig. 1.

Before entering into a detailed description of our new method of testing rods it is desired to call attention to the method commonly used at present in order that the advantages of our method may be more clearly apparent by comparison. A test specimen of the metal of one or more selected rods is forged thereon at one end and this specimen is removed and subjected to the well known methods of testing materials of this character. The test piece however constitutes simply a sample of the entire material which is supposed to be in the rod and furthermore it is destroyed during the process of testing. The specimen may show perfect material and in many cases, it is true, the rod of which it had been a part would also be perfect but it is obvious that it can not always give an accurate indication of the quality of the whole rod nor can it detect flaws, cracks or other structural defects in the rod itself. A test of this character is not applied to each rod individually because specimen pieces are forged only on a certain proportion of the rods. By our new method however each rod is individually and searchingly tested.

In the apparatus here shown, the piece to be tested is stressed in the direction of the maximum load to which such piece is subjected in service, in order that the results of the test may be truly representative of the performance to be expected of the piece in service. The stress is imposed quite suddenly, by way of shock or impact produced by sharp arrest of falling mass. As here shown, this mass is that of the piece itself, which is first dropped and then suddenly arrested at its upper end, so as to impose a tensile shock on it by virtue of its own momentum acquired while falling. The height through which the piece falls before being thus arrested is a measure of the intensity of stress to which it is subjected,—indeed, the stress can readily be computed from the height and the weight dimensions of the piece. Experience has shown that if the piece survives a sufficient drop unbroken, its essential soundness and freedom from substantial defects are very definitely proved: in other words, that the test is perfectly uniform and reliable in its results.

From Figs. 1, 2, 3, and 4, it will be seen that the apparatus shown comprises a pair of upright shallow channel-like ways 10 adapted to guide the connecting rod P to be tested by the opposite edges of its enlarged ends e. These ways 10 are braced to the massive machine base or bed 11 by means of four pyramidally spreading anglebar or T-bar struts 12 (omitted from Fig. 2 for the sake of clearness). In the usual squared opening in the rod end e that is uppermost when the rod P is being tested is mounted and tightly clamped a stop member 15 of correspondingly shaped cross section. Into the stop ends 16 of the member 15, which project sidewise from the rod P, are screwed eye pieces 17 (see Figs. 5 and 6), and in them is engaged a rod 18 with a central eye 19. The rod P is suspended by the stop member 15 by means of the suspension device 17, 18, 19 and a trip 20 whose retroverted lower end 21 hooks into the eye 19. The trip 20 may conveniently be actuated to drop the rod P endwise by pulling on a rope 22 attached to the long upper lever arm 23 of the trip.

The stops 16 at either side of the rod P project out between the inturned edges of the ways 10 by means of which the rod is guided. In their paths as the rod P falls is a pair of anvils 25, one at either side of the ways 10. When the stops 16 strike the anvils 25, the upper end of the rod P is arrested quite suddenly and held against further descent. Owing to the momentum previously acquired by the falling rod, this impact and arrest produces a sudden longitudinal tensile stress or shock on the rod. This impact stress is in the nature of a pull directed downward, away from the upper end of the rod and toward its lower end.

Ultimately, of course, the rod P as a whole may rebound from the anvil means 25 and then fall back again, with accompanying changes and variations of stress and strain. The conditions and phenomena above described, however, occur at the very moment of impact of the stops 16 on the anvils 25.

After the rod P has been tested to a proper maximum drop with one end e uppermost, it may be reversed and similarly tested with the other end uppermost, so as to insure stressing both its ends alike. Of course, when this is done a stop member 15 must be secured in the hole at the opposite end. In case of a break when the rod is dropped either way, more information is, of course, acquired if the rod is tested by dropping it through a number of successively greater heights than if it is initially dropped the maximum height that it is expected to stand.

The sudden stress imposed on the rod by testing as above described is of the very sort that the brittle metal of an unsound piece is least capable of enduring, so that the test is a very searching one. It can, therefore, be so gaged as to assure detection of an unsound piece without overstressing and injuring a sound one. Moreover, the apparatus is simpler and its operation more rapid and convenient than an ordinary tensile testing machine. The maximum stress and strain in the rod P being in the same direction as the maximum loads imposed by the piston thrust and pull in service on a locomotive, the results of the test indicate very reliably what may be expected from the rod in actual service.

By lateral adjustment of the guides 10, 10 toward or away from one another, the same machine can be adapted to rods of varying dimensions. One of the guides 10 may be graduated with a scale 30 (see Fig. 3), as a convenient means of determining the height of drop. The rod P and the trip 20 may be raised to the desired height for each drop by any convenient means, such as a cable 31 connected to an eye-piece 32 to which the trip is pivoted at 33, and passing over a pulley 34 mounted on a suitable overhead structure or support 35. The anvils 25 between which the piece P falls may be accurately spaced apart at their upper ends by means of rods 36 connected between them. These anvils 25 are extremely massive, heavy, solid blocks or slabs of metal,—many times as heavy and massive as the rod P to be tested,—both in order that they may not themselves be broken or deformed by the great shocks to which they are subjected, and in order that they may offer the solid, unyielding resistance to the rod P necessary to arrest it suddenly and to bring it under the desired shock and stress. They may preferably be made of forged or cast steel. The stop or pin member 15 may either be of a very high grade of forged steel, or may be made of an ordinary grade of steel and very frequently replaced.

The manner of carrying out our method above outlined is the preferred one; but in its broader aspects the method could be just as effectively carried out were the scheme reversed, that is, were the rod held stationary in a vertical position and the weight dropped upon the blocks passing through the lower head of the rod. This latter method has been made the subject of a divisional application Serial No. 699,980, filed March 18th, 1924.

We claim:

1. The method of testing rods, which consists in dropping the rod to be tested endwise and suddenly arresting its upper end, so as to impose a tensile shock on the rod by virtue of its momentum.

2. The method of testing rods according to claim 1, which consists in dropping the rod as therein set forth first with one end down, and then with the other end down.

3. Apparatus for testing rods comprising means for releasably suspending the rod to be tested, and means cooperating with the upper end only of the rod for suddenly arresting it as it falls after release so as to produce a tensile shock on the rod by virtue of its momentum.

4. Apparatus for testing rods comprising stop means adapted for connection to the rod adjacent one end and so as to project sidewise from the rod when it is being tested, means engageable with the stop means for releasably suspending the rod and anvil means in the path of said stop means as the rod falls when released for suddenly arresting the falling rod.

5. Apparatus for testing rods comprising upright guide means for the rod to be tested, a stop member adapted to be mounted in one end of the rod so as to project sidewise therefrom, means whereby the rod may be releasably suspended vertically in said guide means, and anvil means in the path of said stop member at either side of the rod for suddenly arresting the latter in its fall when released.

6. Apparatus for testing rods comprising stop means adapted to be connected to the rod adjacent one end thereof so as to project sidewise from the rod during the test, means for releasably suspending the rod with the end adjacent the stop means uppermost, and anvil means in the path of said stop means as the rod falls when released adapted to suddenly arrest the falling rod.

In testimony whereof we have hereunto signed our names.

WILLIAM L. REID.
FRANK J. BASCOMBE.